Jan. 25, 1949.  F. C. KEMBER  2,460,178
EMERGENCY ROADWHEEL ASSEMBLY FOR AUTOMOBILES
Filed June 2, 1945  9 Sheets-Sheet 1

INVENTOR
Federico Carlos Kember
BY Ivan P. Tashof,
ATTORNEY

Jan. 25, 1949.　　　　　　F. C. KEMBER　　　　　　2,460,178
EMERGENCY ROADWHEEL ASSEMBLY FOR AUTOMOBILES
Filed June 2, 1945　　　　　　　　　　　　　　　9 Sheets-Sheet 2
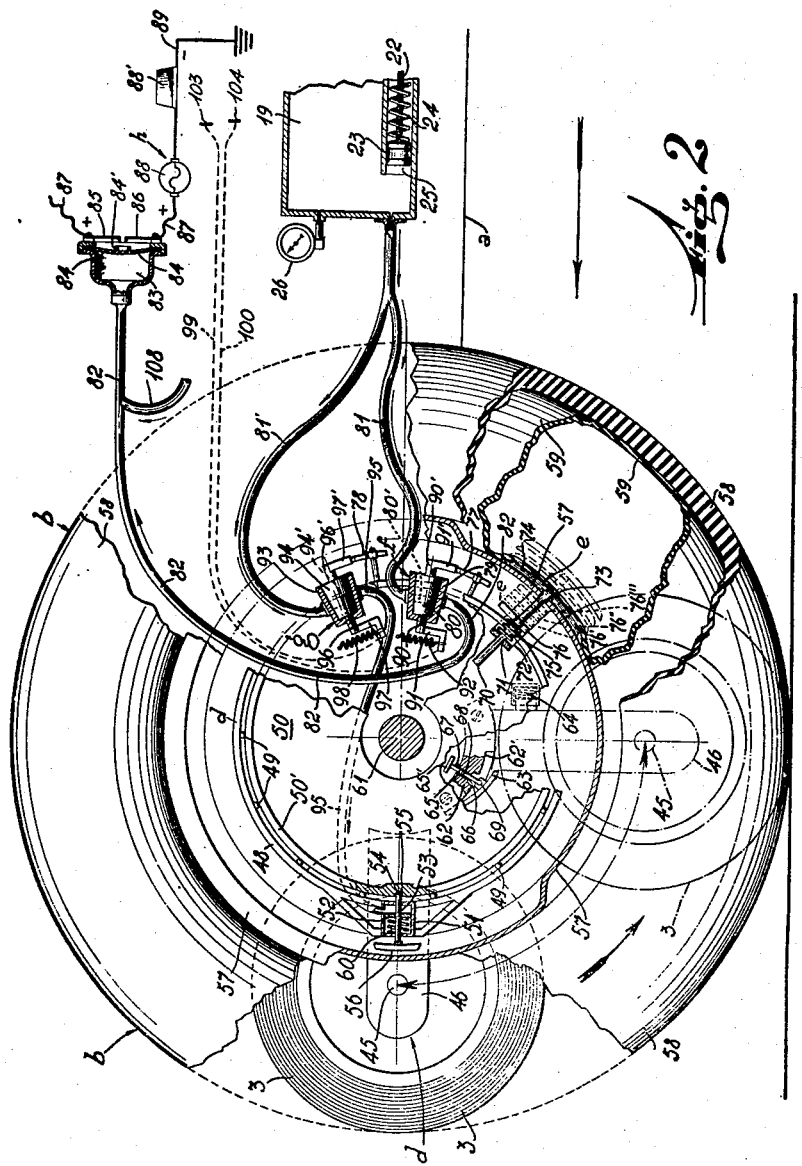
INVENTOR
Federico Carlo Kember
BY Ivan P. Tashof
ATTORNEY

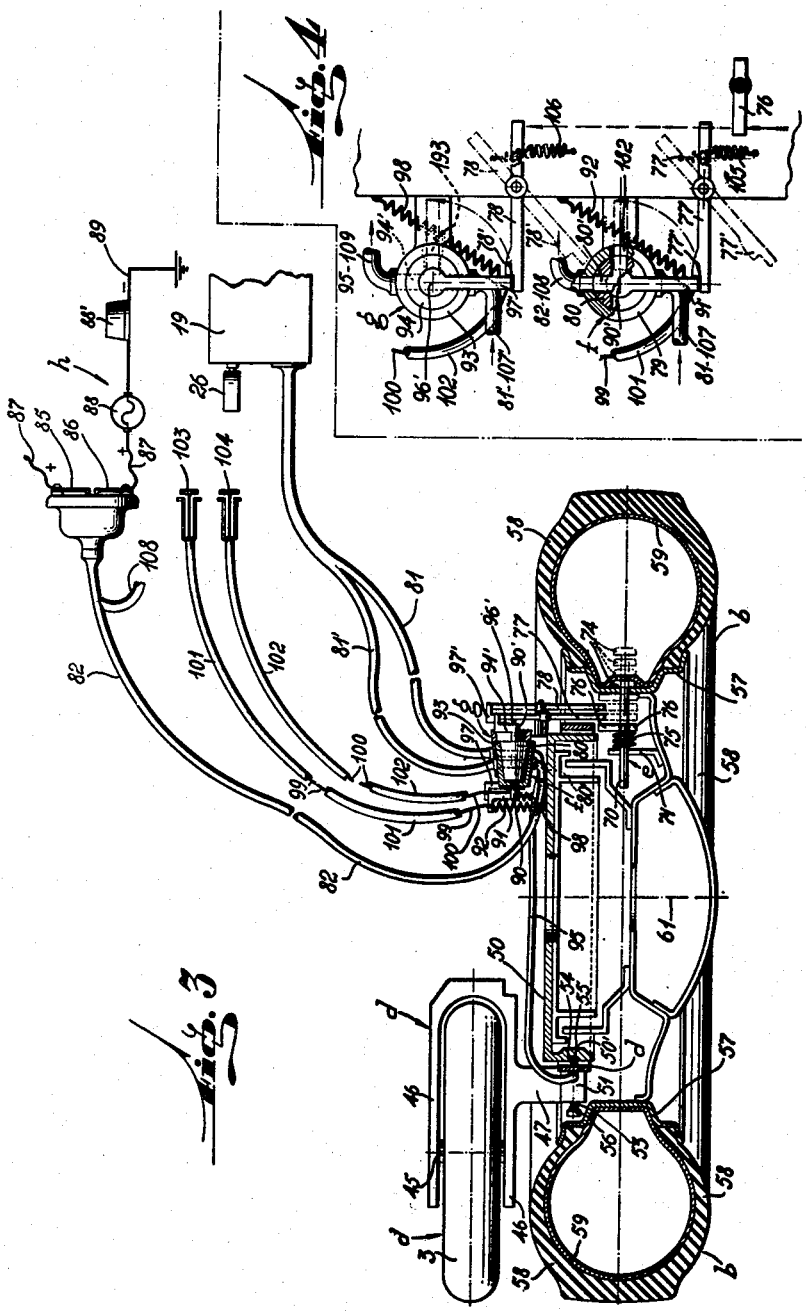

Jan. 25, 1949.   F. C. KEMBER   2,460,178
EMERGENCY ROADWHEEL ASSEMBLY FOR AUTOMOBILES
Filed June 2, 1945   9 Sheets-Sheet 4

INVENTOR
Federico Carlos Kember
BY
ATTORNEY

Jan. 25, 1949.  F. C. KEMBER  2,460,178
EMERGENCY ROADWHEEL ASSEMBLY FOR AUTOMOBILES
Filed June 2, 1945  9 Sheets-Sheet 5

INVENTOR
Federico Carlos Kember
BY Ivan P. Tashof,
ATTORNEY

Jan. 25, 1949.　　　　F. C. KEMBER　　　　2,460,178
EMERGENCY ROADWHEEL ASSEMBLY FOR AUTOMOBILES
Filed June 2, 1945　　　　　　　　　　　　　　9 Sheets-Sheet 6

INVENTOR
Frederico Carlos Kember
BY
ATTORNEY

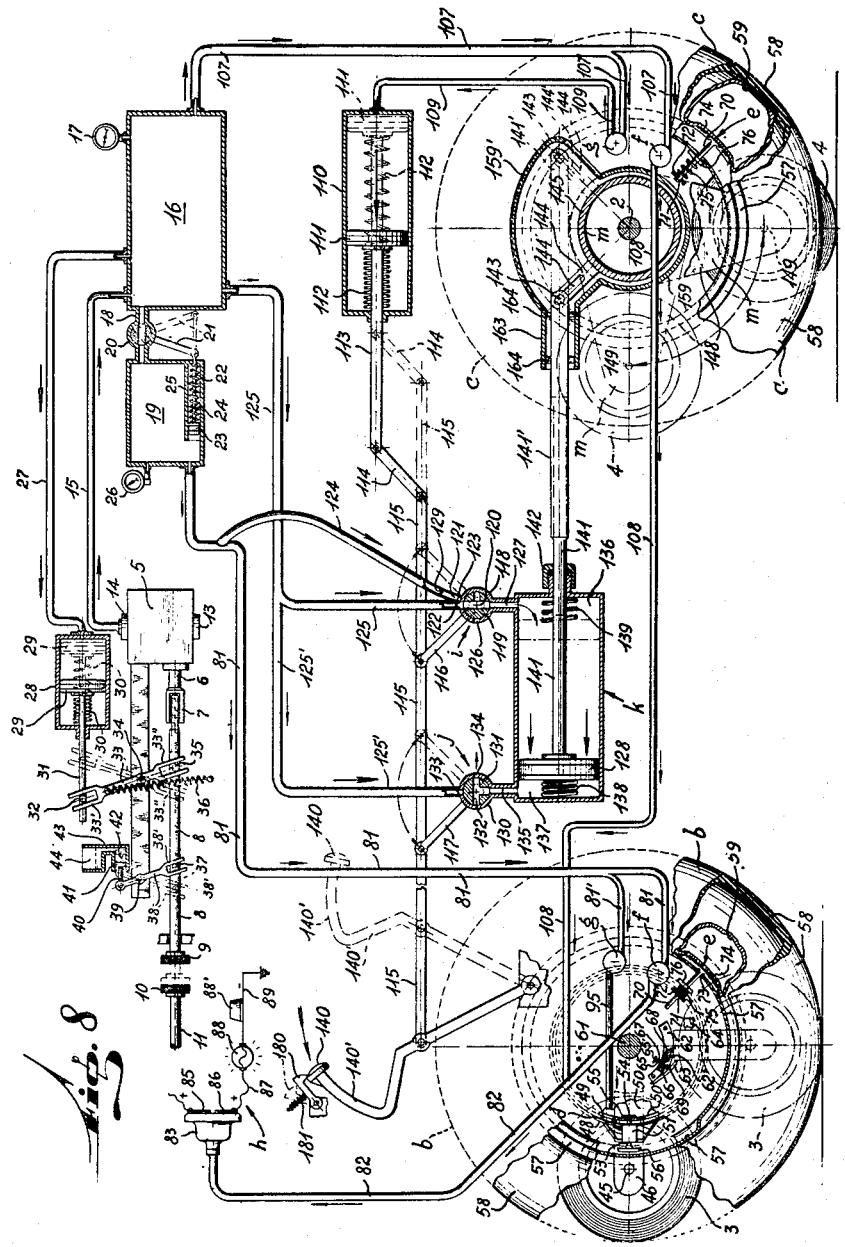

Jan. 25, 1949.  F. C. KEMBER  2,460,178
EMERGENCY ROADWHEEL ASSEMBLY FOR AUTOMOBILES
Filed June 2, 1945  9 Sheets-Sheet 8
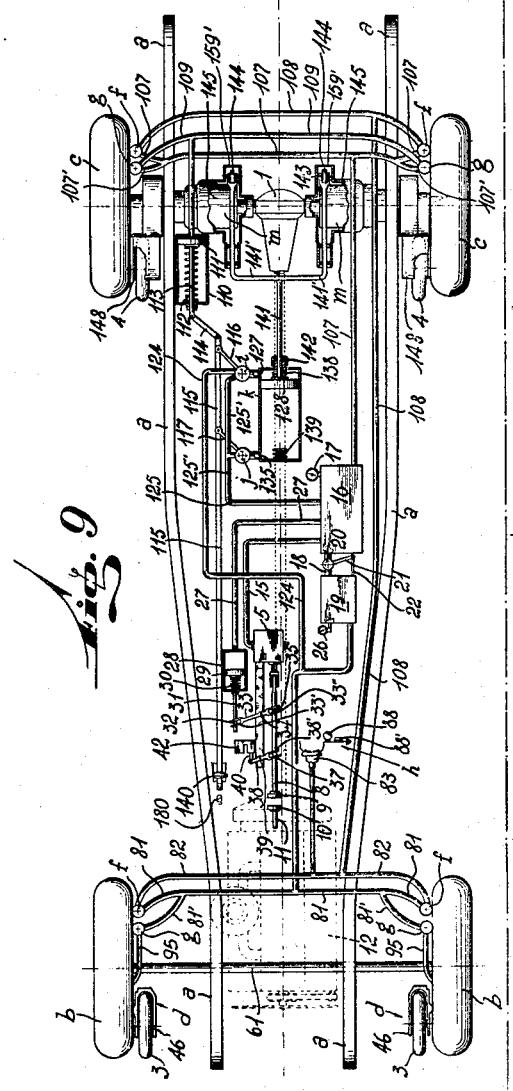
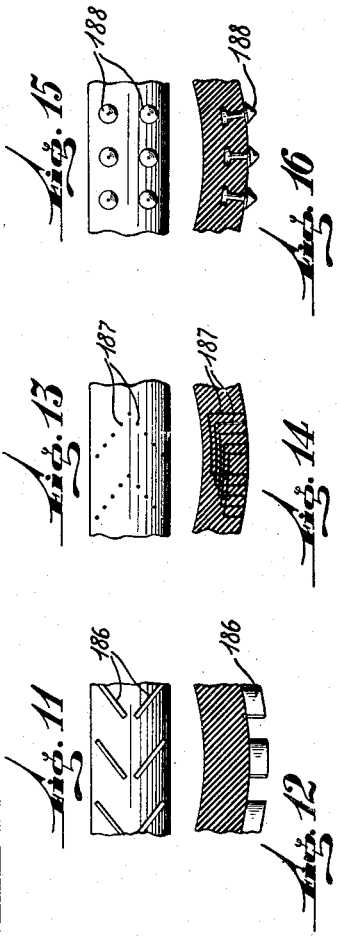
INVENTOR
Federico Carlos Kember
BY
ATTORNEY

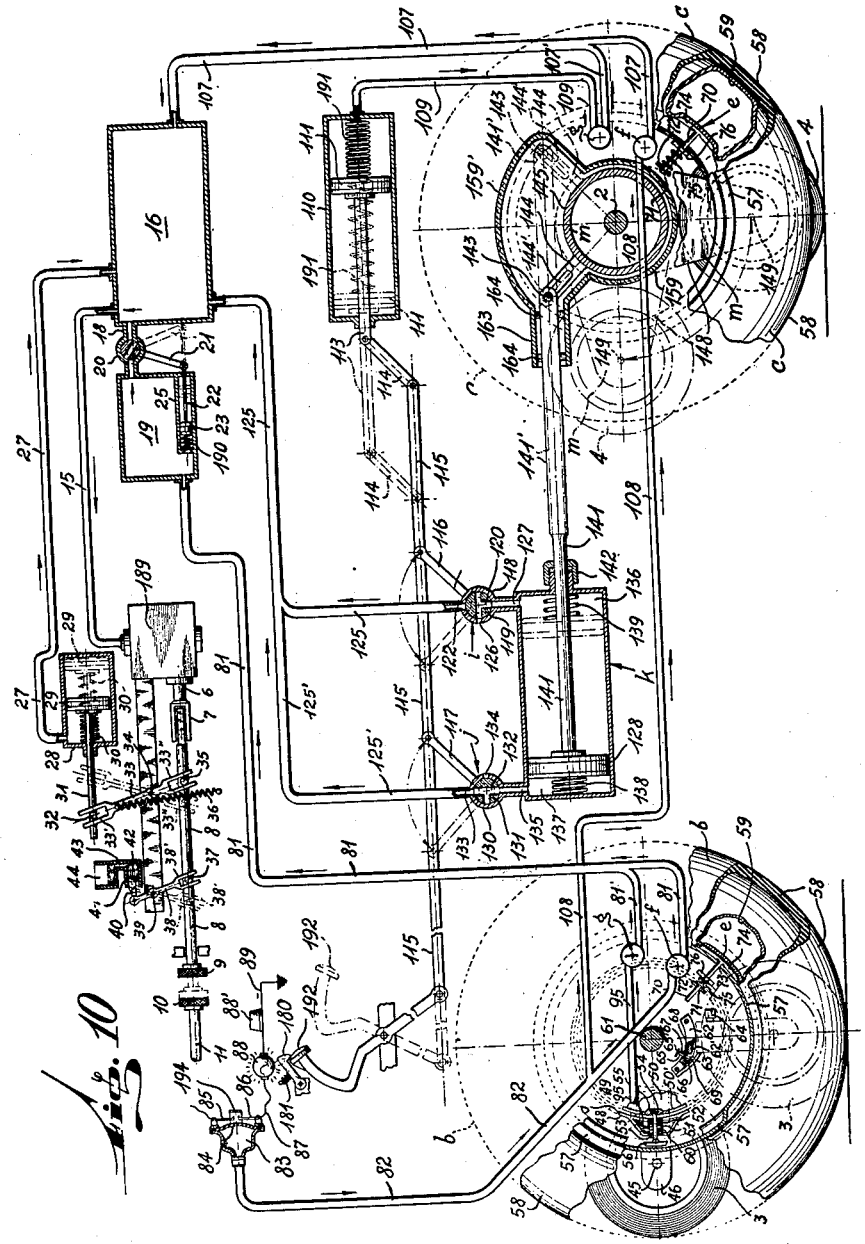

Patented Jan. 25, 1949

2,460,178

UNITED STATES PATENT OFFICE 2,460,178

EMERGENCY ROAD WHEEL ASSEMBLY FOR AUTOMOBILES

Federico Carlos Kember, Buenos Aires, Argentina

Application June 2, 1945, Serial No. 597,164
In Argentina March 16, 1945

21 Claims. (Cl. 180—1)

The present invention concerns an emergency roadwheel assembly for automobiles or mechanically propelled vehicles.

As is well known, the normal run of a vehicle may be effected by many factors, more particularly so, through lack of balance resulting from skidding and puncturing of the tires.

In general attempts made to counteract the effects of deflation of the tires by supplying air and by other means, have been of theoretical interest; in practice, they have had neither success nor acceptance, in any appreciable degree.

The most usual method of avoiding skidding or slipping, is to apply chains or other additional devices to the treads. This, although effective, can be used only on boggy or muddy roads. For general use, such anti-skid aids are practical only if they can be combined with some device which will allow ready attachment and detachment; but this desideratum has not hitherto been reduced to practical form by any system whatsoever.

Taking this into account and, in view of the disadvantages which the application of direct auxiliary devices to the roadwheels entails, consideration has been given the possibility of employing other supplementary wheels adapted to replace, at the proper time, the support and action of the main wheels. It is precisely on such consideration that the assembly of the present invention is based. Said assembly far from being merely an emergency element actually attains the rank of a true improvement for automotive vehicles in general.

The invention provides each roadwheel of the vehicle with a supplementary or secondary retractable wheel, smaller than the main wheel with which it is associated, displaceable about the axle thereof, so that it may assume at least two positions. From the inoperative position, when defects occur in the performance of the main roadwheel, the supplementary may be brought into play.

To this end, each main wheel is fitted with a mechanical device which, so long as the air pressure in the tire is normal, occupies a certain position. When said pressure drops, the device is displaced in such a manner that it produces the effect necessary to cause the supplementary or secondary wheel, to contact the road in order to support the vehicle either in the driving or driven action thereof.

It should be noted that the secondary road wheels have been assembled to serve not only as automatic substitutes in response to a puncture or deflation in the tire of a main roadwheel, but they also may be brought into action at will, so that in case of emergency, particularly when acting on slippery ground they may avoid skidding and ensure the normal run and stability of the vehicle. This is due to the fact that the aid given by the supplementary wheels may be not only that of mere rolling support, but also may be of a driving nature, since for that purpose the aforesaid secondary wheels may be coupled indirectly to the engine of the vehicle.

In addition to the foregoing, the present invention contemplates other objects, amongst which the foremost is that of providing elements of security adapted to bring into operation a secondary wheel for each main road wheel, the tire of which may become deflated or otherwise fail.

Another object is to avoid as far as possible the danger of overturning or undue deviation of the vehicle, since, either automatically, or by action of the driver himself, the emergency wheels may be brought into play, these being sufficient to enable the vehicle to maintain its stability until it can be stopped. Said emergency wheels may also serve as road wheels until a repair shop is reached.

A further object of the invention is to enable the vehicle to run on marshy or slippery ground, without compelling the driver to get down from the car to fit the anti-skid devices, since, from the driver's seat itself he may bring the secondary wheels into action which later on, when the ground is no longer troublesome, may be retracted so as to enable the vehicle to proceed on its main wheels.

Another object is to permit the vehicle to be put into a condition by which it may move on any kind of ground, even over snow or ice, and for such a purpose special tread strips may be applied to the emergency wheels.

Other objects of the present invention will become apparent from the description thereof, which for greater clearness has been illustrated by way of example and in a preferred embodiment in the accompanying drawings.

In the drawings:

Fig. 1 is a side view of an automobile equipped with the emergency wheel assembly, in combination with the main roadwheels, which are represented partly in section in order to show the device which is responsive to the pressure of the tire. It is this device that becomes displaced if a certain drop in pressure occurs, this displacement starts the alarm and brings the respective secondary wheel into play.

Fig. 2 is a diagrammatical detail view of one of the front wheels shown in elevation, the automatic device cʹ which is in inoperative position because the tire is shown inflated, and therefore the secondary or substitute wheel is retracted.

Fig. 3 is a diagrammatic plan view of the assembly of Fig. 2 also showing the automatic device and the supplementary wheel in inoperative position.

Fig. 4 is a detail of one of the valves which allow compressed air to pass or vacuum to be created when the automatic device actuates its corresponding lever.

Fig. 8 is a diagrammatic elevational view of all the pressure fluid connections and mechanical elements which control and connect the various means constituting the accessories of the assembly. In this figure the secondary driving wheels have been brought into play as a consequence of the puncturing of one of the tires or else by the actuation of a corresponding lever.

Fig. 9 is a diagrammatic plan view of the assembly applied to the chassis of an automobile, all the elements being shown in their inoperative positions.

Fig. 10 is a diagrammatic view of the equipment in a modified embodiment so far as the actuating means is concerned, since in this instance, instead of being of the pressure fluid type, the motions are produced by vacuum or depression. This view is similar to that of Fig. 8 and the mechanism of the auxiliary driving wheel is likewise in the operative position.

Fig. 11 is a view of the surface of a portion of a tire tread with ribs for marshy ground, snow and soft ground. This tread is for a secondary driving wheel.

Fig. 12 is a side view of a portion of the tire of Fig. 11.

Fig. 13 is a view of the surface of another portion of a tire, the tread of which is formed of rubber and abrasive materials such as emery and the like, and has good road-gripping qualities which are enhanced by wire studs. This tread likewise is for a secondary driving wheel.

Fig. 14 is a side view of the tire of preceding Fig. 13.

Fig. 15 is a view of the surface of another type of tire tread provided with projecting studs or metallic heads to ensure good gripping contact with the roads. This tread also is for a secondary driving wheel and finally.

Fig. 16 is a side view of the portion of the tire of preceding Fig. 15.

In the several figures the same reference characters indicate like or corresponding parts. Devices or elements comprising various parts are indicated by reference letters.

Figure 1:
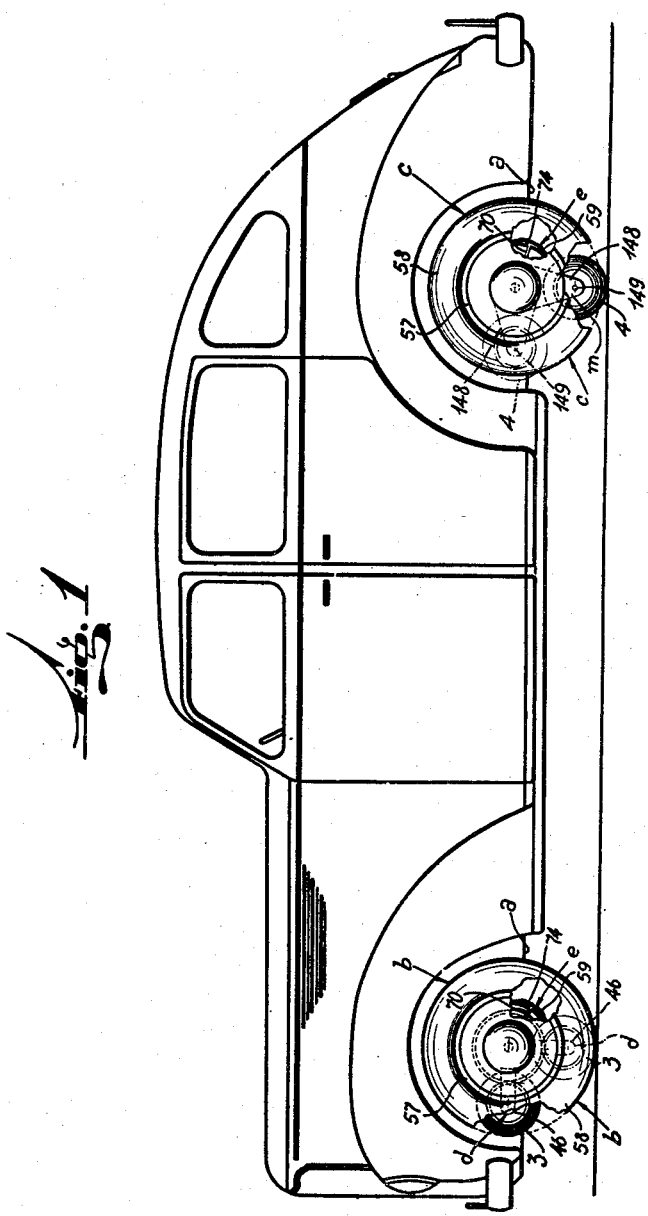

As may be seen from the drawings, a is the chassis of the vehicle, b are the front wheels and c are the rear wheels which in this case are the driving wheels, since from the corresponding engine of the vehicle power is transmitted to the differential 1, Fig. 9, from which the axles 2 (Fig. 7) project terminating in the respective wheels c already mentioned.

Each front wheel b includes a secondary or supplementary wheel 3, whereas the driving wheels c include respective secondary or supplementary wheels 4, which together with the first mentioned wheels 3 constitute the assembly of the present invention, which for its operation and action depends on compressed air or pressure fluid or vacuum. In the example of Figs. 8 and 9, the action is produced by compressed air supplied by the compressor 5, whereas in Fig. 10 the action is produced by vacuum created in the suction device 189. This vacuum system will be described later.

The compressed fluid system shaft 6 of compressor 5 by means of sleeve 7 is coupled to the sliding shaft 8 which through clutch member 9 may be coupled to clutch member 10 of shaft 11, deriving from the cam shaft or any other suitable part of the vehicle engine (Figs. 8 and 9).

The air inlet of compressor 5 is indicated by reference numeral 13, and from outlet 14 thereof a pipe 15 leads to tank 16 in which the compressed air is stored until a high pressure is reached. For this reason the tank will hereinafter be referred to as the high pressure tank. The high pressure tank 16 is provided with a manometer 17.

The tank 16 has a passage-way 18 through which it communicates with tank 19. In said passage-way 18 is valve 20 which has an arm 21 coupled to rod 22 of piston 23. This piston is urged by a spring 24 and acts in cylinder 25, which on the other hand is in open communication with the atmosphere of tank 19, so that when the pressure in this latter tank exceeds the resistance of the spring 24, piston 23 will be displaced to the position shown in dotted lines in Fig. 8 so as to cause closure of valve 20 and thus cut off the flow of air from the high pressure tank 16 to tank 19. This means that in the last named tank the pressure is limited according to the strength of spring 24 and hence in said tank 19 there is a pressure smaller than that obtained in tank 16. Tank 19 is the low pressure tank, and is intended to actuate devices which do not require strong effects. Tank 19 likewise has a manometer 26.

From the high pressure tank 16 a pipe 27 extends to cylinder 28 which has a piston 29 with a spring 30. Piston 29 has a rod 31 which by means of crosshead 32 is associated with fork 33′ of lever 33 (which is mounted on pin 34), said lever 33 with fork 33′, engaging cross-head 35 of sliding shaft 8. Lever 33 is engaged by spring 36 which assumes two main positions, namely, one indicated in full lines and the other indicated in dotted lines in Fig. 8.

When lever 33 is in the position shown in dotted lines, clutch member 9 engages clutch member 10 and thus shaft 8 is connected to shaft 11 so that the motion of engine 12 is transmitted to shaft 6 of compressor 5. When the pressure in tank 16 reaches a certain limiting value, at which it overcomes the resistance of spring 30, piston 29, from the dotted line position, is moved to that shown in full lines in Fig. 8 and thus through cross-head 32, it compels lever 33 to assume the position shown in full lines.

Shaft 8 has a further cross-head 37 by means of which it is associated with fork 38′ of lever 38 mounted on pin 39 and articulated to rod 40 of piston 41 acting in cylinder 42. This cylinder by means of orifice 43 communicates with expansion chamber 44. Since said orifice 43 is of small cross-section, the liquid contained in cylinder 42 may flow to chamber 44 with a certain degree of slowness, and it is for this reason that the combination of lever 38, piston 40 and other elements mentioned, constitutes a retarding device to prevent shaft 8 from being displaced abruptly, whereby a smooth clutching and unclutching action between the members 9 and 10 is achieved.

From the foregoing it follows that in tanks 16 and 19, a charge of compressed air is permanently maintained, since when the air is consumed it is automatically replaced by the reciprocal action of the aforesaid mechanism. In fact, when the pressure in tank 16 drops, spring 30 overcomes the resistance of piston 29, which, from the position shown in full lines, again moves to the position shown in dotted lines thus actuating lever 33 which causes the shaft to be coupled to clutch member 10 by means of its own clutch member 9. In this way compressor 5 is started, which after replacing the charge of air in tank 16, stops automatically since said charge overcomes the action of spring 30 of piston 29, and everything returns to the position shown in full lines in Fig. 8.

Each wheel b, as shown in Figs. 2 and 3, has, as stated above, a respective secondary wheel 3 arranged on the inner side of the car; said secondary wheel, as befits the character of an auxiliary wheel, is mounted so that under certain circumstances it may act in place of the main wheel b.

For this purpose, the shaft 45 of said secondary wheel 3, is mounted in fork 46 which by means of support 47 is connected to ring 48. This ring, by means of rollers 49 is rotably mounted in annular bed 50' of the fixed plate 50 where the brake mechanism of the main wheel b is secured. Since bed 50' and ring 48 are concentric with the axle of wheel b, the secondary or auxiliary wheel 3 can be displaced in the manner of a planet wheel, for example, from the position shown in full lines in Figs. 1 and 2, to the position shown in dotted lines in the same figures.

Ring 48 with support 47, forks 46 and wheel 3, form a movable assembly d and this assembly, when ring 48 rotates upon rollers 49 of bed 50', allows wheel 3 to be displaced from the inoperative position shown in full lines to the operative position indicated in dotted lines in Figs. 1 and 2.

The movable assembly d has an emergency wheel actuating cylinder 51 within which piston 52 acts, with a piston rod 53, which on one hand, after passing through the actuating cylinder 51, terminates outside said cylinder in a pin portion 54, fitting into a notch 55 in bed 50' in order to secure the inoperative position of assembly d. At the other end, rod 53 has a shoe 56 opposite rim 57, on which are fitted the tire 58 and inner tube 59 of wheel b.

Piston 52 is urged by spring 60 which with its load carries pin portion 54 into the retention offered by notch 55. At the same time and with the same tension, the spring maintains shoe 56 retracted from metal rim 57 of the tire of wheel b. Since assembly d is secured to plate 50, the shoe should contact rim 57 as this would offer a braking effect on the free rotation of wheel b.

At the nadir of axle 61 of wheel b, plate 50 serves as a basis to support 62, provided with a retention tongue 63, which cooperates with spring stop 64, to receive and define the position of assembly d when the secondary wheel 3 is carried to the operative position indicated by dotted lines in Figs. 1 and 2.

Said tongue 63 is coupled to rod 65 located in bore 66 of support 62. Said rod 65 has a handle 65' by which it may be grasped in order to retract tongue 63 when it is desired to return wheel 3 to the inoperative position. Rod 65 has two stops, 67 and 68, adapted to define the position of tongue 63, when it is desired to lock or release the assembly d. The first of these stops, 67, limits the displacement of tongue 63, whereas stop 68 is adapted to act as a detent to secure the inoperative position of same tongue 63, since by retracting rod 65 until the tongue fits in recess 62', it will be sufficient to turn rod 65 so that said stop 68 will engage the edge of bore 66. Rod 65 has a rotation sleeve 69 by which it is connected to tongue 63.

In its movable part, wheel b has the device e (Fig. 2), which is automatic, since it combines with the tire of the same main wheel, so that, when the pressure in inner tube 59 drops, either by leakage, puncture or blow out, it will bring wheel 3 into play as a substitute for main wheel b.

Said automatic device e comprises a rod 70 fitting in the guide 71 of support 72, and, as may be seen, through perforation 73 said rod 70 passes through rim 57 and ends in shoe 74 which is in close contact with the inner tube 59 pertaining to the wheel. Rod 70 is urged radially by spring 75 the resistance of which is overcome by the normal pressure of the inner tube of the tire, so that ordinarily shoe 74 and its rod 70 are kept in the position indicated in full lines. But as said spring 75 has a tension capable of overcoming the pressure of the tire if that pressure drops below a predetermined standard, any such fall in the pneumatic pressure causes the spring to assert itself and compress the walls of the inner tube 59, displacing rod 70 with the shoe 74 thereof. Consequently, if the tire is punctured or it loses part of the air contained in the inner tube 59, rod 70 is displaced to the positions indicated in dotted lines in Figs. 2 and 3.

Rod 70 has a stop 76 which, as it accompanies the rotation of wheel b, when displaced it engages and actuates levers 77 and 78 which keep valves f and g in closed position; both of these valves f and g and levers 77 and 78 are mounted on the fixed plate 50. Said valves f and g are of the stop-cock type, with a casing 79 and a rotary body, 80, which, as shown in Fig. 4, is of the so-called three way type, with a T-shaped passage 80'. Valve f receives pipe 81 which comes from the compressed air tank 19, (the low pressure tank) and, as may be seen from the same valve a pipe 82 projects and leads to chamber 83 of alarm device h. Said chamber 83 has a diaphragm 84 which, under air pressure, displaces a contact 84' which serves as a bridging member for strips 85 and 86 inserted as switch members in the conductor 87 connected to lamp 88, in series with a buzzer of audible element 88' which receives the negative conductor 89; said lamp 88 in combination with buzzer 88' forming a visual and audible alarm.

The same body 80 of valve f has two studs, 90 and 90', of which the former is provided with an arm 91 engaged by spring 92 tending to keep open the passage of the valve or with communication between pipes 81 and 82; whereas the second stud 90', has a further arm 91', which in the closed position of the valve, is locked by stop 77' of lever 77. The closed position is that which must be maintained while the vehicle is running.

Valve g is similar to valve f being also of the stop-cock type, with a casing 93, a rotary body 94 and corresponding T shape passage 94' (Fig. 4). Valve g receives pipe 81' which also leads from compressed air tank 19 corresponding to low pressure; at its outlet, valve g is coupled to pipe 95 which, being substantially flexible leads to the change-over cylinder 51. The body 94 of valve g has two studs 96 and 96' of which the former is provided with an arm 97 engaged by spring 98 tending to maintain open the passage of valve g; in other words the spring, when free to assert itself opens passage 94' for communication between pipe 81' and pipe 95 leading to the change-over cylinder 51, where the air pressure reaches the cavity opposite to spring 60. The second stud 96' has another arm 97' which when brought to the closed position of valve g, is locked by stop 78' of lever 78. Also in this case, the closed position of valve g, is that which must be maintained while the vehicle is running. For this reason levers 77 and 78 with stops 77' and 78' must maintain the arms 91' and 97' locked, in order to ensure closure of both valves f and g.

When the tire of wheel b is under normal pressure, it maintains spring 75 compressed, stop 76 maintaining the inoperative position indicated in full lines in Fig. 2, so that when wheel b rotates, the stop 76 which also rotates as a unit with device e, does not contact levers 77 and 78. Lever 77 is at a point next to the inoperative position of stop 76, whereas lever 78 is at another point further away from axis 61.

When pneumatic tube 59 loses sufficient pressure, spring 75 overcoming the pneumatic pressure, causes rod 70 to be displaced; this rod forms part of device e and hence accompanies the rotation of wheel b. Since levers 77 and 78 bear on plate 50 (which is fixed) when stop 76 reaches position 76' corresponding to the circle in which the end of lever 77 lies, it displaces the latter causing it to disengage stop 77' (Fig. 4). Arm 91', is released and due to the tension of spring 92, body 80 will rotate to the position in which passage 80', places pipe 81 in communication with pipe 82. In these circumstances, the compressed air from tank 19, passes through pipe 81, flows through valve f and pipe 82 into chamber 83 where it overcomes diaphragm 84, the contact 84' of which closes the circuit of lamp 88 and buzzer 88' of alarm device h. This means that as soon as a failure occurs in a tire, the latter operates the alarm and warns the driver.

If the deflation continues, and position 76'' is reached, rod 76 will coincide with lever 78 and upon rotating will cause stop 78' to disengage (Fig. 4) and release arm 97' hence the body 94, due to the tension of spring 98, will cause valve g to open. This allows compressed air from tank 19 to pass through pipe 81, 81' to pipe 95 and so reach the change-over cylinder 51 where said air, acting against piston 52, overcomes spring 60 and retracts pin 54 from notch 55 and at the same time causes shoe 56 to engage the rim 57. The rim being in motion, it will compel assembly d (free from obstruction of pin 54), to accompany wheel b until the assembly reaches the operative position, where it strikes stop 64 and locks with tongue 63. Thus, as may be seen from the dotted lines, wheel 3 contacts the ground and serves as a support or substitute for wheel b. Arms 91 and 97, as seen in Fig. 3, are associated with cables 99 and 100 guided in flexible tubes 101 and 102, extending to the dashboard of the automobile where said cables terminate in knobs 103 and 104. The driver, by means of said knobs, may close valves f and g since a pull on them will cause cables 99 and 100 to move arms 91 and 97 to the position shown in Fig. 4, and as levers 77 and 78 will have taken up their initial position due to tension of their respective springs 105 and 106, said closure of valves f and g is again ensured through the lock offered by stops 77' and 78' to arms 91' and 97'. After position 76'', stop 76 may reach position 76''' which is out of contact with levers 77 and 78, so that although the substitute wheel 3 is in operation, if wheel b also rotates, superfluous contact of stop 76 with the aforesaid levers is avoided.

Driving wheels c have a device e (Fig. 5) exactly the same as that of wheels b, since in the same way it comprises a support 72 with a guide 71 for rod 70 which passes through perforation 73 of rim 57 and ends in shoe 74 in contact with the inner tube of the tire. Also in this case the pressure of inner tube 59 should overcome spring 75, but the latter must prevail when the tire loses its normal tension.

As in the case of wheel b, rod 70 of device e has a stop 76 which, after the inoperative position indicated in full lines, may also assume positions 76', 76'' and 76''', of which the first actuates lever 77, the second (76'') actuates lever 78 and the third (76''') corresponds to the inoperative displacement in which it does not reach either of the levers 77 and 78.

In the same way as with wheel b, on plate 50, corresponding to the fixed part or plate that does not rotate with the wheel, are mounted the supports of levers 77 and 78, and there also are likewise mounted valves f and g which are formed, the first by a casing 79 and a rotary body 80 with a T shape passage 80', said body having two stubs 90 and 90' each having an arm 91 and 91', of which the first comprises spring 92 which opens valve f whereas the second arm 91' by means of stop 77' locks with lever 77 when the valve is closed.

Valve g also comprises a casing 93, the rotary body 94 of which has a T shape passage 94', and each of the stubs 96 and 96' thereof has an arm 97, 97' of which the former is attached to spring 98 which carries valve g to the open position, whereas arm 97' is the one which by means of stop 78' locks with lever 78 when the valve is closed.

This shows that device e of wheel c acts in the same conditions as device e of wheel b and valves f and g of wheel c respond under like conditions to those of valves f and g of wheel b; hence Fig. 4 corresponds to the valves of wheel b and to those of wheel c.

Valves f and g of wheel c, in place of receiving pressure from the low pressure tank, receive air from the high pressure tank 16. This is the sole difference with respect to the valves of wheel b; valve f being connected to pipe 107 which extends from said tank 16 and, as in the case with wheel b, valve f of wheel c communicates with a pipe 108 leading to chamber 83 of alarm device h.

Valve g is likewise connected to the high pressure tank, since it receives another branch pipe 107' bifurcated from 107.

Figure 5:
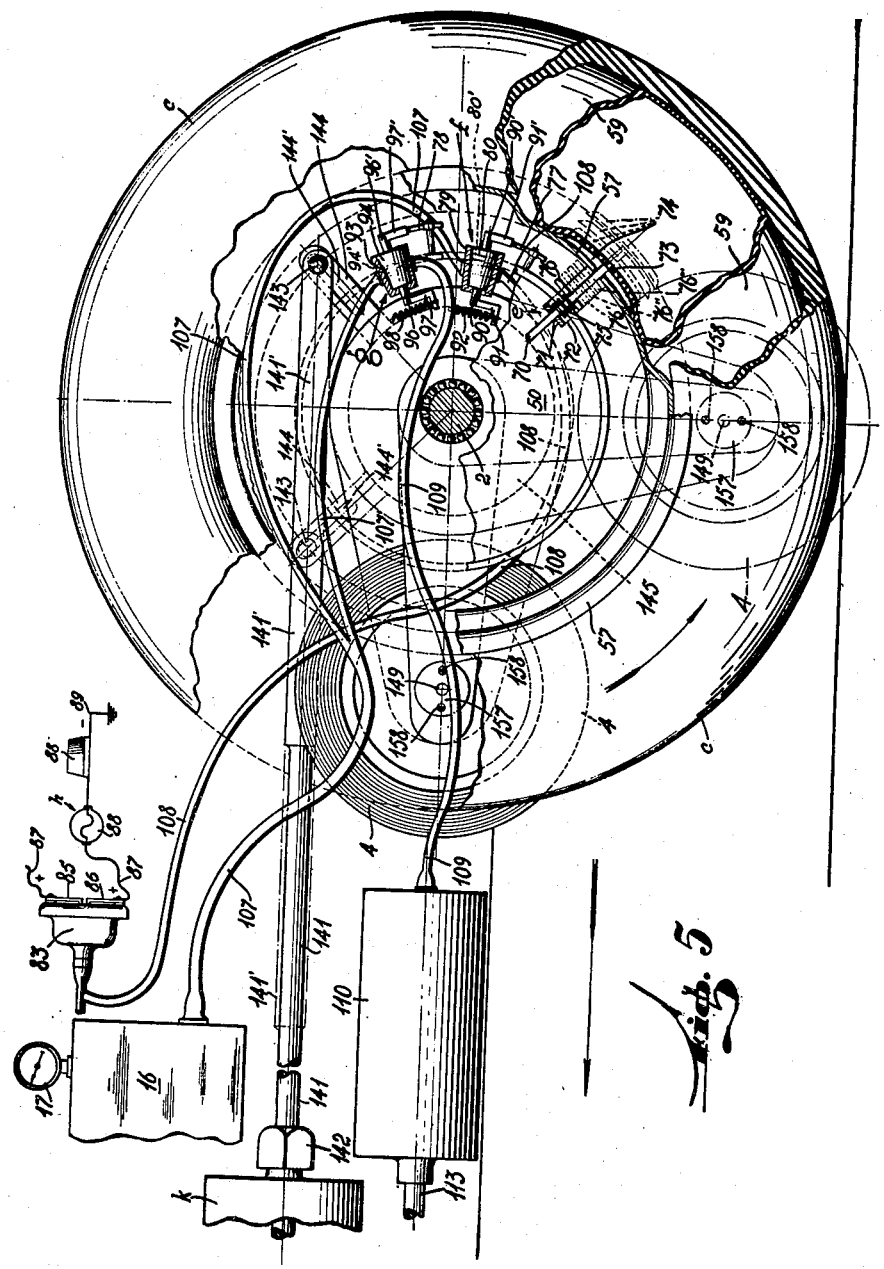
Fig. 5 is an elevation of one of the rear driving wheels showing the automatic device, with the difference, that the valve instead of acting directly on the secondary wheel is indirectly coupled thereto.

As may be seen in Figs. 5, 8 and 9, valve g has an outlet pipe 109 which, instead of being connected directly to the support means of wheel 4, leads to cylinder 110 which carries the emergency driving wheels into play. Said cylinder has a piston 111 provided with spring 112. Piston 111 has a piston rod 113 which by means of connecting rod 114 is articulated to bar 115; engaging arms 116 and 117 of the valves i and j. Valve i is of the stop-cock type and comprises a casing 118 in which the rotary body 119 operates, with a T shape passage 120; said body being the one which has the arm 116 on its pin (Figs. 8 and 9).

The casing 118 of valve i has two inlets 121 and 122, which are adjacent, and separated merely by the partition 123. The inlet 121 is connected to pipe 124, constituting a branch of pipe 81, coming from the low pressure tank 19; whereas, inlet 122 is connected to pipe 125 which extends from the high pressure air tank 16. Said valve i has an aperture 126 open to atmosphere, and through port 127 has an air supply passage to cylinder k the piston 128 of which controls the position of the secondary wheels 4. Since both inlets 121 and 122 are adjacent, when valve i opens, pipes 124 and 125 might be interconnected, said pipes coming from tanks 19 and 16, the pressures in which are different. For this reason pipe 124 has a check valve 129, which closes under air pressure from the high pressure tank 16.

Valve j has a casing 130 housing a rotary body 131 having a T-shape passage 132. Said body 131 has an arm 117 connected to its corresponding pin. The aforesaid valve has an inlet 133 connected to pipe 125', a branch of pipe 125 extending from the high pressure tank 16. Valve j has an opening to atmosphere 134 and another opening 135, connected to cylinder k at a point opposite the connection 127 from valve i. Piston 128 acts as a movable partition between cavities 136 and 137, the former receiving compressed air supplied by valve i, whereas the latter (cavity 137) is supplied with compressed air delivered at suitable times by valve j. At the headers of cylinders k are buffer springs 138 and 139 which act as stops to limit the stroke of piston 128.

Valves i and j as may be seen in Figs. 8 and 9, are responsive to piston 111, but may likewise be actuated by pedal 140 at the vehicle control since said pedal constituted by a lever 140', also engages bar 115. Pedal 140, in addition to serving as a control for the action of valves i and j designed to govern the position of wheel 4, has the advantage of serving to indicate and to advise the driver of the position of wheels 4.

Figure 7:
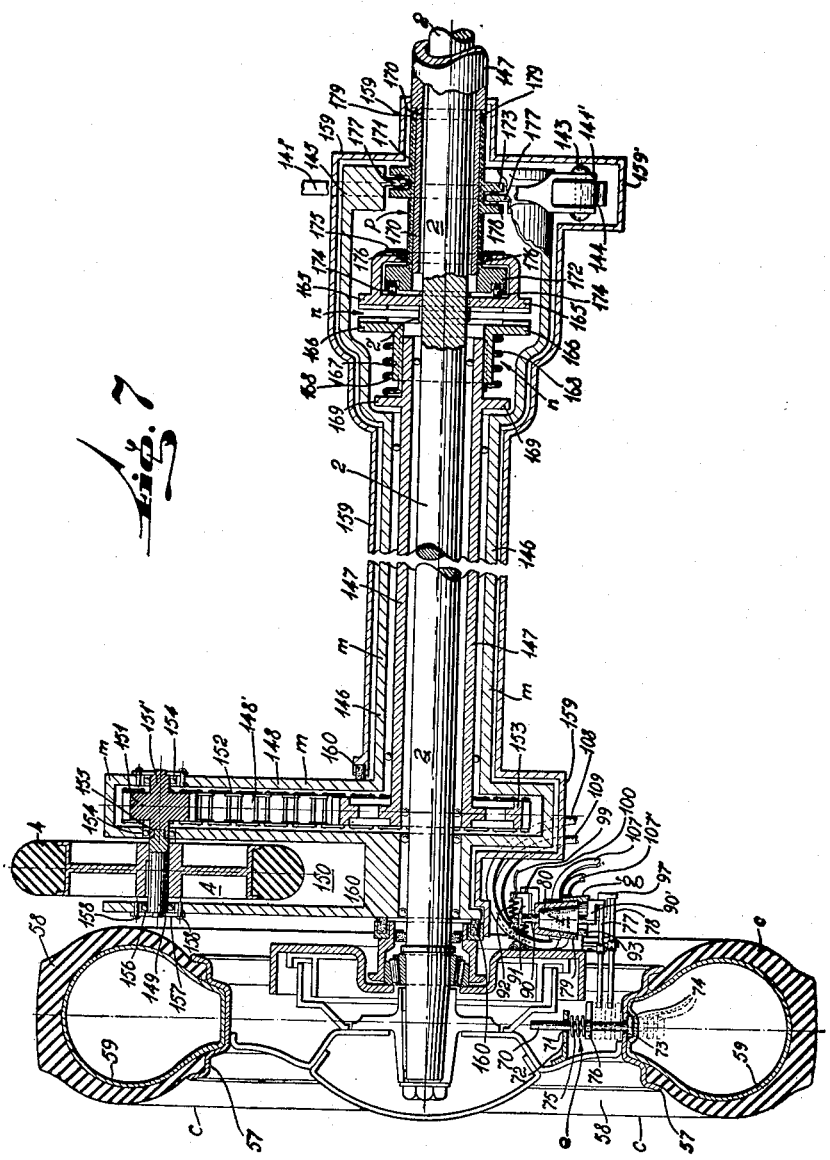
Fig. 7 is a plan view of one of the rear wheels, the secondary wheel thereto and the corresponding clutch and transmission mechanism extending from the rear axle to the secondary wheel.

Piston 128 has a rod 141, which passes through stuffing box 142 and ends in a fork having two arms 141', Fig. 9. Each of these arms 141' has a pin 143 fitting in respective slots 144' in arms 144 of the pair of casings 145 of the corresponding assemblies m, of the pair of secondary wheels 4, which accompany the driving wheels c. As shown in Fig. 7, assembly m of the pair corresponding to the rear wheels comprises, as an extension of casing 145, a tubular body 146 mounted on the tubular shaft 147 which in turn is arranged around axle 2, which associates the planetary of the differential gear with driving wheel c. The tubular body 146 of the assembly m has a radial arm 148 which likewise forms part of the same assembly, this arm constituting the support for shaft 149 of the secondary wheel 4. Each secondary wheel 4, since it accompanies a respective driving wheel c, forms a twin assembly with the wheel on the opposite side of the vehicle.

The secondary wheels 3 have their tread at the same level as that of wheels b, while secondary wheels 4, have their tread slightly projecting with respect to the tread of main wheels c.

Figure 6:
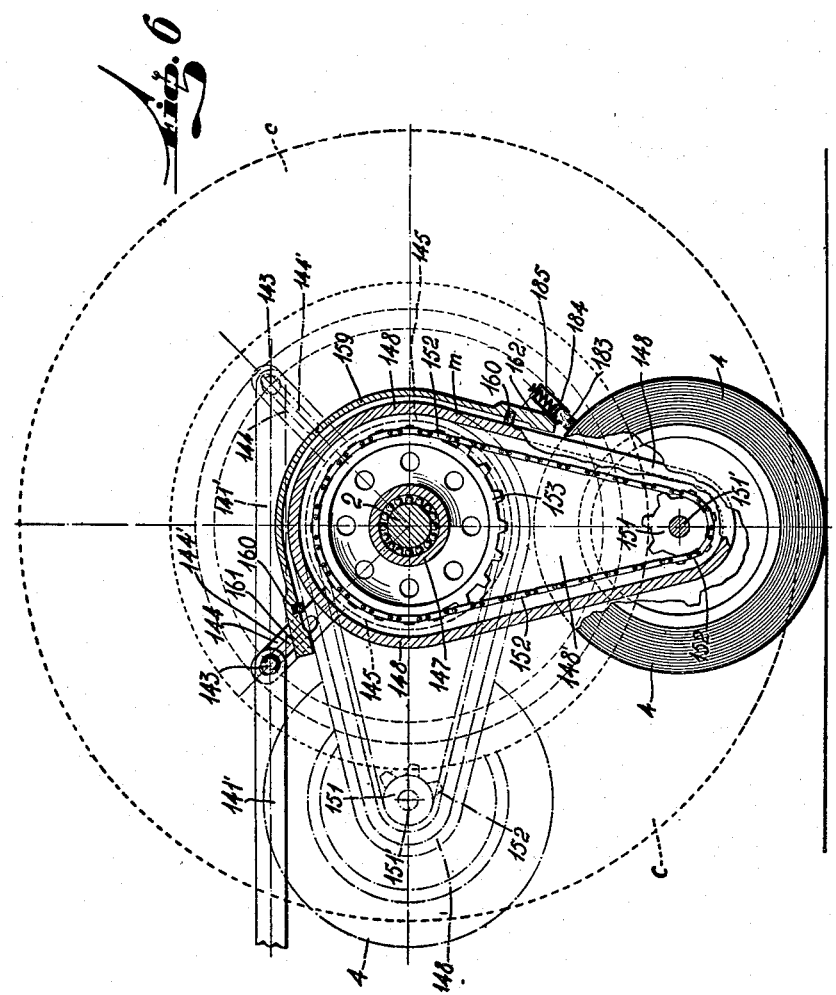
Fig. 6 is an elevation of the auxiliary and main road wheels seen from inside in order to show the transmission mechanism from the bearing to said secondary wheel so that the latter may act as supplementary driving wheel. In this view the secondary wheel is shown in operative position.

Arm 148, is fork-shaped with a gap 150 in which wheel 4 is fitted; the inner branch of arm 148 having a cavity 148' which as a crank case, encloses therein a pinion 151 which by means of chain 152 receives the motion of gear wheel 153 fixed on tubular shaft 147 (Figs. 6 and 7). Said pinion 151 has its shaft 151' mounted on bearings 154 and by means of spigot connection 155 said shaft 151' is coupled to shaft 149, the outer end of which is mounted on bearing 156 disposed against plate 157 which by means of screws 158 is secured to the arm 148 in a removable manner. That is to say that said plate 157, after withdrawing wheel c and removing screws 158 may be taken off in order to remove shaft 149 and thus allow wheel 4 to be taken off for repair or replacement. This enables wheel 4 to be replaced by other similar wheels having treads presenting the characteristics shown in Figs. 11, 12, 13, 14, 15 and 16.

Assembly m is enclosed by dustguard 159, fitted with felts 160, between edges 161 and 162, where arm 148 emerges; and since the latter moves through an angle of 90°, said edges 161 and 162 serve as stops to limit and define the aforesaid two positions of said arm (Fig. 6).

Dustguard 159 is the same cover which extends from differential 1, surrounds casing 145, and with complement 159' encloses arm 144 in the whole of the radius of action thereof. The complement 159' terminates in a projection 163 which shields a certain part of the respective branch 141' corresponding to rod 141, and by means of felt pads 164, said complement 159' closes around said rod to protect the portion of the stroke thereof.

Each casing 145 (Fig. 7) houses a clutch n formed by two members 165 and 166 with corresponding control means and accessories. Member 165 is fitted on splines 2' of axle 2 of the differential so that it will rotate with said axle 2. Said splines are sufficiently long to allow longitudinal displacement of member 165 until it engages member 166.

Member 166 is coupled to tubular shaft 147 by means of connection or feather key 167 which allows member 166 a certain amount of longitudinal play, but as may be seen in Fig. 7, said member keeps in a given position due to the expansion of spring 168 which bears on a flange 169 of said shaft 147. This arrangement allows member 166 to yield so that clutch engagement takes place under resilient thrust. As is known, tubular shaft 147 carries gear 153 so that when the clutch is engaged, motion is transmitted through said gear to wheel 4.

The pair of dust-guards 159 extend into the respective casings 145 around axle 2. Said extensions indicated by reference numeral 170, have splines 179 acting as guides to slide p which comprises a tubular portion 171, a plate 172 and the helical threads 173.

Slide p is longitudinally displaceable in order to move member 165 from the unclutched position to the clutched position and vice-versa. For this purpose, plate 172 of slide p is enclosed in the cavity of member 165, which is recessed and suitably shaped to receive same. Since slide p and its plate 172 do not accompany the rotation of member 165, plate 172 is so disposed that by means of rollers 174 it is simply associated therewith so as to obtain the necessary thrust contact.

Since the slide remains stationary while member 165 rotates, the latter may hold a charge of lubricant, and in order to keep said charge hermetically sealed, the part of said member which closes off against the tubular portion 171 of slide p comprises an annular plate 175 which secures the felt pad 176.

The screw threads 173 are associated with projections 177 which are provided with friction contacts 178. Said projections 177 are connected to or form part of assembly m since they are integral parts of the walls of casing 145; therefore said projections are in a position to act in the groove of the screw-thread, when arm 144 corresponding to assembly m is displaced through the action of the respective branch 141' of rod 141.

This means that when valve i (Fig. 8) opens, and air under pressure enters the bore 136 of cylinder k, it displaces piston 128, the rod 141 of which with its two branches 141' carries forward the arms 144 of the two casings 145 corresponding to the pair of assemblies m. With this action, the respective casings 145 and tubular bodies 146 rotate, and consequently, arms 148 move through an angle of 90° bringing the pair of wheels 4 in contact with the ground or road as replacements for wheels c.

At the same time, through displacement of assemblies m, clutch n is engaged, since projections 177, acting as nuts, move along the pitch of the screw-threads 173 and cause slide p to move lengthwise; said slide with plate 172 urges member 165 into the position indicated in dotted lines, in which it engages member 166, thus coupling axle 2 and tubular shaft 147, having gears 153 secured thereto, said gear transmitting the motion to pinion 151; this in turn moving the corresponding wheel 4.

The helical threads 173 are of fairly quick pitch and are calculated so, that engagement of members 165 and 166 shall occur before the assemblies m have completed their displacement from the inoperative to the operative position. In this way each wheel 4 is in driving motion before contacting the road. This prevents the auxiliary wheel from acting as a brake during the transition period.

Arms 91 and 97 of valves f and g of rear wheels c are also engaged by cables 99 and 100 extending to the dash-board in front of the driver.

At the end of the stroke of pedal 140 is a stop 180 which urged by spring 181 locks said pedal when it is brought into operative position (indicated in full lines in Fig. 8); but as will be seen, by reason of the shape of the stop with the same foot it may readily be disengaged, the pedal then returning to the inoperative position indicated in dotted lines. Said pedal returns to said position because of the pull of spring 112 which, as stated above, acts in the change-over cylinder 110.

On edge 162 (Fig. 6) there is a brush 183, guided in tube 184 and subjected to the pressure of spring 185. This brush acts with its bristles against the tread of wheel 4, to keep said wheel suitably clean during or after use.

As has herein been stated one type of secondary wheel 4 is intended for snow, or marshy ground and the tread thereof is provided with fins or projections 186 arranged in the form of a V or in any other suitable manner for the purpose envisaged (Figs. 11 and 12).

Another type of wheel 4 may be pneumatic or solid tires, and since it is designed to avoid skidding, the tread must have anti-skid properties. For this purpose rubber with coarse emery and metal particles may be used. It might be advantageous to use steel wires 187, arranged so that the ends thereof are flush with the surface of the tread, as shown in Figs. 13 and 14, and, in certain cases, the tread may have on its surface metallic studs 188 as shown in Figs. 15 and 16, with which to grip on ice and similar surfaces.

Vacuum system

As shown in Fig. 10, when operating with vacuum, the system should include a suction device 189 in place of the compressor 5. Said suction pump 189 by means of pipe 15 is coupled to tank 16 which has likewise coupled thereto the tank 19 through valve 20, the arm 21 of which is connected to rod 22 of piston 23 which is urged by spring 190 acting in a sense opposed to that of member 24, since by its pressure it tends to hold the piston out, i. e.: it urges the piston to the position corresponding to the opening of the valve.

In order to operate on vacuum, the change-over cylinder 51, corresponding to wheels 3, is similar to the one of the type working on compressed air, with the difference that pipe 95, instead of acting in the part opposite to spring 60, is coupled to the same cavity in which said spring 60 is located, since when vacuum is established, the depression must be caused in the cavity of the spring in order to overcome the effect thereof, to disconnect stem 54 from notch 55 and to engage shoe 56 against rim 57.

The change-over cylinder 110 corresponding to wheels 4 (Fig. 10) also receives pipe 109 in the portion in which spring 191 is located since in the same way, when vacuum is established through pipe 109, the pressure of said spring must be overcome in order to carry the piston to the operative position indicated in same Figure 10. This shows that spring 191 is in a different position with respect to spring 112 intended to work on compressed air.

In the example of Figure 10, valves i and j are in identically the same form as in the previous case of Figs. 8 and 9, since they are similarly connected to pipes 125 and 125' deriving from tank 16, but the operation now being by vacuum, both valves act in inverse manner to that shown in Figs. 8 and 9. In order that piston 128 of cylinder k may bring assembly m to the operative position of secondary wheels 4, vacuum must be established in cavity 137, and it is for this reason that valve j must open while cavity 136 is opened to atmosphere through valve i. To return to the inoperative position of wheel 4, it is in cavity 136 where vacuum must be produced for this, valve i opens while valve j communicates cavity 137 to atmosphere. This same action of the vacuum on piston 128 and cylinder k produces consequently the connection and disengagement of clutch n (Fig. 7).

In the case of Fig. 10, the action of bar 115 is inverse to that shown in Fig. 8, the control pedal indicated by reference numeral 192, differing from pedal 140 in so far as concerns the kind of lever, since on being depressed said lever must push bar 115 instead of pulling on it. This pedal 192 has a stop 180 which operates in the same manner as in the compressed air system.

The automatic system for maintaining ambient conditions in the tanks 16 and 19, is achieved by the same means which were indicated for the equipment charged with compressed air, except that in this case (when operating on vacuum), pipe 27 is coupled to cylinder 28 in the part corresponding to spring 30 so that, when the predetermined degree of vacuum has been reached, this overcomes said spring and displaces piston 29 which with its rod 31 causes movement of lever 33 originating the longitudinal displacement of shaft 8 for disengagement of member 9, causing stoppage of the suction pump.

Operation

When operating with compressed air, if the main and secondary tanks 16 and 19, are empty, shaft 8 with clutch member 9 will remain coupled to clutch member 10; as a consequence of this, when the engine 12 is started, the compressor 5 will charge the main or high pressure tank 16, part of the contents thereof passing on to the secondary or low pressure tank 19, until the pressure overcomes spring 25 of piston 23, and valve 20, intercommunicating the two tanks, closes automatically. When the air reaches a predetermined pressure in tank 16, same air passing through pipe 27 will actuate piston 29 of cylinder 28, displacing lever 33 towards the dotted line position at which the clutch member 9 of shaft 8 is disconnected. In these circumstances, compressor 5 stops until the pressure in tank 16 drops.

With this charge of air in tanks 16 and 19, the emergency wheel equipment is ready to operate automatically when any of the main wheels b or c fail.

For example, if one of the front wheels b loses air by leakage or puncture, or blow out spring 75 overcomes the pressure of the tire; the stop of device e which follows the wheel b, upon moving radially up to position 76' strikes the lever 77 releasing arm 91' which allows valve f to open under the pull of spring 92 allowing air to pass from pipe 81 to pipe 82 through which it goes to chamber 83 of the alarm device h. Under this air pressure diaphragm 84 moves and by contact 84', connects the two strips 85 and 86, closing the circuit which operates buzzer 88', and lights lamp 88 thus warning the driver that a failure or some such abnormal event has occurred in the wheels.

As it continues on its stroke, rod 70 by the pressure of spring 75 reaches with its stop 76 the position 76" which coincides with lever 78. The latter, on being displaced by said same stop, releases arm 97', causing spring 98 to open valve g which allows air to pass from duct 81' to pipe 95 which carries it to the cavity of change-over cylinder 51. When the air enters said cylinder 51, displacement of piston 52 is obtained, whereby rod 53 thereof retracts pin 54 from notch 55, leaving assembly d free from the stop corresponding to the inoperative position indicated in full lines in Fig. 2. At the same time shoe 56 of said rod contacts rim 57 of wheel b which, being in motion, compels the assembly to rotate with its ring 48 about/bed 50' of plate 50, and as a result wheel 3 reaches the lower portion contacting the ground as it indicates in dotted lines in Fig. 2. This position is determined by the engagement of assembly d with stop 64, and is maintained by the lock offered by stop 63. In these conditions, wheel 3 becomes a substitute of the main wheel. The coupling of the shoe with rim 57 does not prevent free rotation of wheel b since said shoe is metallic and the pressure thereof is relatively small. Moreover, since the driver is warned, he may readily interrupt said connection of shoe 56 with rim 57, by pulling knobs 103 and 104; valves f and g then close again, and are held in this position by stops 77' and 78' belonging to levers 77 and 78. And as in this position the passages 80' and 94' are in front of respective openings 182 and 195 which lead to the atmosphere (Fig. 4), the pressure in chamber 83 and change-over cylinder 51 immediately disappears, and, while diaphragm 84 returns to its normal position stopping the alarm, spring 60 returns piston 52 to its original position retracting shoe 56 from rim 57. On the other hand, as stop 76 continues to move due to the continued escape of air from the tire, when it reaches position 76''', it will be spaced away from the lines where levers 77 and 78 are located, for which reason the rotation of wheel b is free from all superflous effects. Consequently, wheel 3 may act as a substitute of wheel b without any trouble as regards the continued run of the vehicle.

When the fault has disappeared, it suffices to take knob 65' of rod 65 and retract retention tongue 63 so that assembly d may be free to be carried back to the inoperative position indicated in full lines in Fig. 3. This inoperative position is again defined by the retention offered by pin 54 when it engages notch 55 of bed 50'.

If the puncture or failure occurs in either of the rear wheels c, the automatic device e will act in the same manner as in the case of wheels b. That is to say, when the pressure drops in the inner tube 59, Fig. 5, rod 70 is displaced radially and since said device e follows the rotation of the wheel, when stop 76 reaches position 76' it strikes lever 77 thereby releasing arm 91' whereby due to the tension of spring 92, valve f opens allowing air to pass from pipe 107 to pipe 108 leading to chamber 83 of alarm device h, where owing to the air pressure, diaphragm 84 moves so that contact 84' connects the two strips 85 and 86, closing the circuit which actuates buzzer 88' and lights lamp 88, thus warning the driver that a pneumatic abnormality has occurred in the wheels.

As rod 70 continues on its stroke, through pressure of spring 75, it reaches with the stop thereof the position 76", which coincides with lever 78, and the latter on being displaced by the action of said stop, releases arm 97', thus causing spring 98 to open valve g, which allows air to pass from pipe 107' to pipe 109. As may be seen in Fig. 8, due to the opening of valve g, the air going to change-over cylinder 110 carries piston 111 from the position shown in dotted lines to the position shown in full lines. This action, through rod 113 and connecting rod 114, is reflected on bar 115, which on moving lengthwise carries arms 116 and 117 from the dotted line position to the full line position shown in same Fig. 8. In this manner valve j is closed and valve i is opened, the latter first allowing low pressure air to start the effect, and thereafter giving free passage to air conducted by pipe 125 from high pressure tank 16. The compressed air which enters cavity 136 of cylinder k, actuates piston 128 and moves it from the dotted line position to the full line position (Fig. 8). The air contained in cavity or chamber 137 escapes through aperture 134 of valve j.

On the displacement of piston 128, rod 141 with its two branches 141' draws the arms 144 forward causing the pair of assemblies m to rotate through 90°, so that their respective arms 148 are moved to the position indicated in full lines in Figs. 1 and 8, in which the secondary wheels 4 contact the ground as substitutes for the main wheels c.

At the same time, by rotation of assemblies m, engagement of the clutch n is achieved, since projections 177, acting as nuts, move in the helical groove of screw-threads 173, causing longitudinal displacement of slide p, which with its plate 172 pushes member 165 to the position shown in dotted lines, where it engages member 166, for the purpose of transmitting motion from respective axle 2 to the tubular shaft 147, which with gear 153 and chain 152, transmits the action thereof on pinion 151 which sets in motion the corresponding wheel 4. With the operation of wheels 4, not only is the replacement of wheels c as regards supporting action achieved; it also includes driving action, since with said wheels 4 the automobile may be driven as such to the first service station for the purpose of repairing affected main wheels.

As the bar 115 is directly connected to pedal 140, and since the latter has a stop 180, when the emergency action occurs, said pedal is locked by said stop 180 and therefore the whole mechanism corresponding to valves i and j remains in operative position as shown in Fig. 8.

This being so, it is not necessary to maintain the action of the air which operates in the change-over cylinder 110. Therefore the driver may close valves f and g by pulling on knobs 103 and 104, so that cables 99 and 100 will move arms 91 and 97 to the position in which arms 91' and 97', respectively, are locked by stops 77' and 78' of levers 77 and 78.

Once the fault has been repaired, it is sufficient to displace stop 180 and release pedal 140 so that spring 112 may return all the parts to the inoperative position shown in dotted lines in Fig. 8; that is to say, that when it moves piston 111 back, the bar 115 moves lengthwise carrying arms 116 and 117 to the dotted line position in which valve i closes, and valve j opens.

Valve i remains as a release valve, since its passage 120 communicates cavity 136, through opening 126 with the atmosphere. Thus the high pressure compressed air admitted by valve j, enters cavity 137, moves piston 128 to the dotted line position, and as a consequence thereof, rod 141 with its two branches 141' will move the respective arms 144 to the position shown in dotted lines, causing the assemblies m to rotate through 90°, as required in order that the two arms 148 and wheels 4 of the rear auxiliary pair may return to the inoperative position indicated in Fig. 5, in which the main wheels c are again active.

When the pair of assemblies m return to the dotted line position, the projections 177, acting as nuts, again move in the groove of the screwthread 173, but in the opposite direction, causing slide p, to disengage member 165 from member 166. It is in this manner that in the inoperative position wheels 4 remain idle.

If rear wheels c fail to act as they should on slippery or excessively soft surfaces, the driver may at once put the auxiliary or secondary wheels 4 into service, by depressing pedal 140 until it is engaged by stop 180. On actuation of this pedal 140 the whole mechanism of bar 115 moves into the full line position in which valve i opens whereas valve j closes, whereby piston 128 causes displacement of both wheels 4, while at the same time, as has already been stated, clutches n are engaged, placing their respective wheels 4 into service as driving wheels.

As stated, auxiliary wheels 4 may be changed in order to use treads suited to road conditions, that is to say that such treads may have fins 186 (Figs. 11 and 12) or anti-skid elements such as those shown in Figs. 13, 14, 15 and 16.

Due to the way in which wheels 4 are mounted, they may be readily changed. In fact, it is sufficient to remove screws 158 and plate 157 and subsequently withdraw shaft 149, in order to be able to remove wheel 4 and replace same when necessary.

Instead of compressed air, oil or any other suitable pressure fluid may be used.

Secondary driving wheels 4, when in service, and due to their connection with axle 2 by means of clutch n (constituted by members 165 and 166) respond to the same brake as main wheels c, so that no special brakes are required to operate with said secondary wheels.

Since the ratio between gears 153 and 151 corresponds to that between wheel 4 and its respective main wheel c, when the secondary wheels 4 are put in service, they rotate at such a speed that no disturbance in progressive action occurs in the change; the driving roll is equivalent. For this reason, secondary wheels 4 may come into play at any speed at which the vehicle may be travelling.

Since, in addition to the automatic mechanism, assemblies m are also responsive to pedal 140, wheels 4 with the same facility with which they are put into service at any moment, may be retracted and brought to their inoperative position by voluntary action. It is, in fact, sufficient to disengage stop 180 in order to release pedal 140, and allow spring 112 to return the whole mechanism responsive to bar 115 to the inoperative position. This permits alternate running on the main wheels c and secondary wheels 4, without having to stop the vehicle.

When a suction pump 189 is used in place of compressor 5, or if the outfit is run on vacuum, according to Fig. 10, operation of the system is practically the same as that described for compressed air, except that in some elements the action is reversed to obtain the same positive effects.

Since for want of vacuum piston 29 will be initially in the position indicated by dotted lines in Fig. 10, lever 33 will also assume the dotted line position, thus maintaining member 9 clutched. When engine 12 starts, action is transmitted by shaft 8 to suction pump 189 which rarefies the air in tank 16 and secondary tank 19. When sufficient depression is obtained, spring 190 is overcome and piston 23 causes valve 20 to close. This limited vacuum operates the alarm and actuates a suitable time on piston 52 of cylinder 51 thereby placing the secondary front wheels 3 into service.

Once valve 20 is closed, the depression in tank 16 continues until a predetermined degree of vacuum is reached; set by the strength of spring 30.

When said vacuum is attained in tank 16, piston 29 is drawn along to the extent of causing a change in the position of lever 33 which actuating on shaft 8 causes disengagement of member 9, stopping the pump.

This condition is maintained until the vacuum is altered through working of the mechanism. But it is automatically restored, because the spring cannot be held back by the reduced vacuum, and it then displaces piston 29 to the dotted line position thus again causing the clutch to engage and hence the suction pump to operate whereby the vacuum is reestablished.

If one of the front wheels loses air due to a leak or a puncture, the mechanism of the automatic device e and of valves f and g operates in the case of Figs. 2, 3 and 4 wherein spring 75 overcomes the pressure of the tire and then, the stop 76 of device e, which follows the wheel b, upon being displaced radially to the position 76', strikes lever 77 causing it to disengage arm 91'. This in turn, by the tension of spring 92, causes valve f to open and produce a vacuum in the chamber 83 of alarm circuit h. Since when working with vacuum, diaphragm 84 acts inversely to its operation by compressed air, (example of Fig. 10) said diaphragm has a contact 194 which bridges the tongues 85 and 86; the contact 194 closes the circuit lighting the lamp 88 and producing the corresponding sound in element 88' which announces the pneumatic failure or abnormal condition of the wheels.

In like manner, as may be seen in Figs. 2, 3 and 4, if the loss of air continues due to displacement of rod 70 under pressure of spring 75, stop 76 reaches position 76" which coincides with lever 78. The latter, on being displaced by action of said stop, releases arm 97' causing spring 98 to open valve g which establishes the vacuum. The vacuum acting in cylinder 51 in that part corresponding to spring 60, as shown in Fig. 10, causes displacement of piston 52 whereby rod 53 thereof retracts pin 54 from notch 55, releasing assembly d from the retention corresponding to the inoperative position shown in full lines in Fig. 2. And, as in the case of compressed air, also by means of the action of rod 53, shoe 56 thereof engages rim 57 of wheel b which, being in motion (as shown graphically in the same Figure 2), compels assembly d to rotate with its ring 48 around bed 50' of plate 50, and as a result, wheel 3 reaches the lower part where it engages the ground (dotted line in Fig. 2). This operation position is limited and ensured as stated hereinbefore by means of stop 64 and tongue 63.

The remaining movements are explained by the operations already described.

If the puncture or failure occurs in either of the driving wheels, the action by vacuum is practically the same, since device e comes into operation under identical conditions. In fact, as shown in Fig. 5, when stop 76 reaches position 76', it actuates lever 77 releasing arm 91' which causes spring 92 to open valve 80, causing vacuum in chamber 83, the diaphragm 84 of which, connected in the manner shown in Fig. 10, causes device h to give the alarm.

Since, when rod 70 continues on its travel, stop 76 reaches position 76" (Fig. 5); when said stop strikes lever 78, it releases arm 97' causing spring 98 to open valve g thus producing vacuum in change-over cylinder 110, where in opposition to spring 191 said vacuum causes displacement of piston 11 (Fig. 10). Thereby the two arms 116 and 117 are changed to the position indicated in full lines. In this case, operating on vacuum, valves i anl j will act inversely to what they do in the system of compressd air. In effect, when valve j establishes communication between cylinder k and tank 16, vacuum is produced in cavity 137, bringing piston 128 to the position shown in full lines. This position is reached without difficulty since valve i acts as an air intake from the atmosphere. This means that through the action of piston 128 the displacement of assemblies m is obtained, which bring wheels 4 to the operative position indicated in same Fig. 10.

As in the case of actuation by compressed air, in the present instance, when piston 128 moves by the effect of vacuum, clutches n become connected and transmit motion from axle 2 to secondary wheels 4, through the tubular shaft 147, gear 153 and pinion 151.

Since bar 115 is directly connected to pedal 192, and the latter has a stop 180, when the emergency action occurs, said pedal is locked by said stop 180, and therefore all the mechanism corresponding to valves i and j will remain in operative position, as shown in full lines in Fig. 10. In this manner, assistance of vacuum is not necessary to maintain the position to which the unit has been moved, because stop 180 cancels the pressure of spring 191 tending to move the mechanism to inoperative position.

Once the damage has been repaired, everything may be brought back to normal or inoperative position by merely disengaging stop 180, since spring 191 will move piston 111 to the dotted line position which causes wheels 4 to be unclutched and put out of service.

The general operations are explained by the action described.

Summarizing, the present invention is concerned with an emergency road-wheel assembly for automotive vehicles, the essential feature of which is that it comprises against each of the front wheels b and driving wheels c a retractile secondary wheel (3 or 4) which is of smaller diameter than the main wheel, and is mounted on a displacement assembly (d or m) associated with a change-over cylinder (51 or 110) the piston (52 or 111) of which is connected to displacement control means for said assemblies (d or m), said control means being constituted in the front wheel 3 by the rim 57 of the main wheel itself, associated to a shoe 56 whereas in the driving wheel said control means are constituted by a cylinder k the piston 128 of which, according to the position of certain valves i and j which are responsive to the action of the piston 111 of the change-over cylinder 110, governs the said assemblies m in order to produce the operative or inoperative position of the emergency wheels 4. Said change-over cylinder (51 or 110) has connected to it a duct (which in the front wheels is constituted by pipes 81' and 95, whereas in the driving wheels said duct is constituted by pipes 107' and 109), said duct being derived from a tank the internal pressure of which differs from that of the atmosphere, that is to say, that the pressure in said tank may be greater than atmospheric (compressed air) or less than atmosphere vacuum. Inserted in said duct is a check-valve g provided with an opening element (lever 78) which is located within the radius of action of a stop 76 belonging to an automatic device which comprises a movable element the inoperative position of which is maintained, by the normal pressure of the tire of the main wheel of the vehicle, and in turn said movable element is subjected to the pressure of a spring which in opposition to the pressure of the tire is of a strength slightly less than the normal tension of the tire itself.

In addition to the valve g corresponding to the emergency change-over cylinder (51 or 110) each wheel has another valve f inserted in a conduit which is also derived from a tank the internal pressure of which is different from that of the atmosphere. Said conduit is coupled to a chamber 83 of an alarm device h. (On the front road wheels the said conduit is composed of pipes 81 and 82 and on the driving or rear wheels it is formed by pipes 107 and 108.) This valve f also has a corresponding opening element (lever 77) which is located within the radius of action of the stop 76 corresponding to the automatic device e, the unit being mounted so that the immovable part 50 which follows the movable part of the wheels of the vehicle, forms the base for the valves $f$ and $g$, whereas the movable part of the same wheels carries the automatic device $e$ for the corresponding action on the levers which cause the automatic emergency opening. And on the same fixed part which follows the movable part of the wheels of the vehicle, there is mounted the corresponding assembly ($d$ or $m$) with means for defining the operative or inoperative position and means for causing displacement thereof. Moreover, the emergency driving wheels 4 have coupled to their axle a mechanical transmission with a coupling clutch to the respective axle of the rear pair, the setting into service of which depends on the movement or displacement of the assemblies $m$.

It should be understood that by automotive or mechanically propelled vehicles it is meant all vehicles which have wheels and are provided with their own engine, such as automobiles, trucks, collective transport vehicles in general, amphibian vehicles, aircraft with landing trains and the like, the comprising trailer carriages with pneumatic wheels susceptible of being fitted with the anti-deflation safety device and emergency wheels, coupled to the tank, the internal pressure of which is different to atmospheric, located in the automotive vehicle.

It is evident that when carrying the present invention into practice, many modifications may be made in so far as certain details of form and construction of the apparatus are concerned, without however departing from the fundamental principles specified clearly in the appended claims.

I claim:

1. An emergency road wheel assembly for automotive vehicles having a plurality of main vehicle wheels comprising a secondary retractile emergency wheel located next to each main vehicle wheel and of smaller diameter than such main vehicle wheel, a displacement assembly, an emergency wheel change-over cylinder including a piston, the cylinder being combined with the displacement assembly and the secondary wheels being mounted on said displacement assembly, control means for the displacement of said assembly connected to said piston, a tank, the internal pressure of which differs from that of the atmosphere, a pipe connecting said cylinder and tank, an inflatable tire on the vehicle wheels, an automatic device including a stop and a movable element, said movable element being maintained in inoperative position by normal pressure in said inflated tire, this last element being constantly spring urged towards an operative position by means having a force slightly less than the normal pressure in the inflated tire, a valve inserted in said pipe, and a valve-opening element located in the path of said stop.

2. An emergency wheel assembly for automotive vehicles having a plurality of main vehicle wheels, each including a rim, said assembly comprising a secondary retractile emergency wheel located next to and of smaller diameter than each vehicle wheel, a displacement assembly, the secondary wheels being mounted on the displacement assembly, a cylinder combined with the displacement assembly and including a piston, control means for the displacement assembly connected to the piston, a tank, the internal pressure of which differs from that of the atmosphere, a pipe connecting the cylinder and the tank, an inflatable tire on each main wheel, an automatic device mounted on the movable portion of the wheels and having a stop and a rod, said rod being guided in a corresponding mounting and passing through the wheel rim, a shoe on the rod subjected to the pressure of the inflated tire to maintain the rod in an inoperative position, spring means slightly weaker than the normal pressure in said tire urging said rod to an operative position, a valve inserted in said pipe and an opening element coupled to said valve and located in the path of said stop.

3. An emergency wheel assembly for an automotive vehicle having a plurality of main vehicle wheels each including a rim and an inflatable tire mounted on the rim, a displacement assembly comprising a secondary retractile emergency wheel located next to and of smaller diameter than each main wheel and mounted on said displacement assembly, a cylinder combined with the displacement assembly and including a piston, control means for the displacement assembly connected to the piston, a tank, the internal pressure of which differs from that of the atmosphere, a pipe connecting the cylinder and the tank; a fixed member mounted close to each emergency wheel, an automatic device including a stop and a movable member, said movable member being maintained in inoperative position by said inflated tire, spring means slightly weaker than the pressure in said tire disposed to urge the movable member to an operative position, said fixed member including a first check-valve inserted in said pipe, and a second check valve, said second valve being inserted in a second pipe, a chamber including a diaphragm operated switch, an alarm device, an electrical circuit including said alarm device and said switch, said second pipe being connected between said chamber and the aforesaid tank.

4. An emergency wheel assembly for an automotive vehicle according to claim 3, in which each of the said check valves is composed of a casing secured to the fixed member and enclosing a rotary member having pivot pins, one of said pins having an arm, spring urged to the open position of the valve, and another pin having an arm adapted to engage a stop defining the closed position of the valve, said stop being mounted on a lever pivoted on said fixed member and extending into the path of said stop.

5. An emergency wheel assembly for an automotive vehicle according to claim 3, comprising opening means associated with each of said check valves, said valve opening means being at different distances form the axis of the wheel, whereby they coincide with different positions of displacement of the stop of said automatic means.

6. An emergency wheel assembly for an automotive vehicle according to claim 1, in which for the front wheels, the said cylinder is fixed to the mounting of the respective emergency wheel and said piston is connected to a rod having a pin, spring urged into a notch which defines the inoperative position of the emergency wheel, said rod likewise having a shoe positioned opposite the rim of said wheel, and spring urged away from the rim, said rim acting as the control means for the displacement of the secondary wheel.

7. An emergency wheel assembly for an automotive vehicle according to claim 1, in which each secondary emergency wheel (corresponding to an non-driving wheel) has a mounting secured by means of a rotary ring on a bed pertaining to an immovable part associated with the main wheel, said immovable part having at the point corresponding to the inoperative position of the secondary wheel, a retention notch engaged by a pin forming part of the rod belonging to the change-over cylinder, said immovable part having at another point a limiting stop and a stop defining the operative position of the secondary wheel.

8. An emergency wheel assembly for an automotive vehicle according to claim 1, in which each secondary wheel corresponding to a driving wheel has a displacement mounting, the cylinder being outside said mounting and the piston of said cylinder having a rod coupled to a bar, which works two valves on a second cylinder including a second piston having a rod projecting beyond the second cylinder and being subdivided into two branches, arms on said displacement mounting coupled to said branches, said valves being inserted in a conduit derived from the same tank aforesaid, said valves comprising a movable body portion and being in inverse positions whereby the open position of the one valve corresponds to the closed position of the other valve.

9. An emergency wheel assembly for an automotive vehicle according to claim 1, in which each secondary emergency wheel corresponding to a driving wheel has operatively associated therewith a displacement assembly, the change-over cylinder being indirectly associated with said assemblies, by means including a pair of inlet and outlet valves, the piston of said cylinder with the rod and transmission members thereof being coupled to control said valves which are disposed on the end of a second cylinder having a piston and a bifurcated piston rod, said bifurcated piston rod being coupled as control means for the displacement of the secondary emergency wheels.

10. An emergency wheel assembly for an automotive vehicle, according to claim 1, in which the control cylinder for the displacement of the assemblies corresponding to the secondary emergency driving wheels has an inlet and an outlet formed by two check valves connected to said tank and having each an arm coupled to a bar connected to the piston rod of the change-over cylinder and to an actuating pedal lever which in operative position has a corresponding detent disengageable by displacement.

11. An emergency wheel assembly for an automotive vehicle, according to claim 1, in which the cylinder the piston of which constitutes the direct control of the displacement of the assemblies corresponding to the secondary wheels which accompany the driving wheels of the vehicle, has two resilient stops at the ends of the piston stroke, and in which said cylinder has a check valve at its inlet and outlet, each connected to a respective cavity, the cavities being kept independent by the interposition of the piston itself.

12. An emergency wheel assembly for an automotive vehicle, according to claim 1, in which the assemblies of the secondary emergency wheels which accompany the driving wheels, have an angularly displaceable arm where by means of a fork they engage the axle of the respective auxiliary wheel, said assemblies being arranged as housings with a portion serving as tubular shaft around the main axle, said assemblies, by means of another arm being coupled each to a respective branch of a bifurcated rod connected to the piston of the cylinder controlling the direct displacement of said assemblies.

13. An emergency wheel assembly for an automotive vehicle, according to claim 1, in which the assembly of the secondary wheels which accompany the driving wheels, has an axial tubular portion which is covered by a dust-guard into an aperture of which, limited by abutting edges, extends an arm which has a fork portion supporting the respective secondary emergency wheel, said aperture being of the dimensions necessary for the displacement of the arm from an inoperative to an operative position, said dust-guard being complemented by a cover enclosing the arm of the assembly and part of the bifurcated branch of a rod connected to the piston of the cylinder controlling the displacement.

14. An emergency wheel assembly for an automotive vehicle, according to claim 1, in which the emergency wheels accompanying the driving wheels, have a shaft connected to a pinion meshing with a gear including a tubular shaft mounted around the corresponding axle, said tubular shaft having a member associable with a second movable member secured to said axle, said movable member forming with the other member a clutch and being associated with a slide having a helical thread, said slide having coupled thereto in a nutlike manner, projections pertaining to the mounting assembly of the emergency wheels, said assembly having an arm connected to the change-over control means for the same wheel.

15. An emergency wheel assembly for an automotive vehicle according to claim 1, in which the rear pair of wheels has a pair of clutch means, one being connected by sliding and spring means to a tubular shaft having a gear mounted thereon and meshing with a pinion pertaining to the emergency wheel, and another member secured slidably on the corresponding axle by splines, said second member having the form of a housing the hollow thereof enclosing a thrust plate that forms part of a sliding element mounted in guides on an extension of the dust-guard surrounding the axle, said sliding element being of a tubular form with anti-rotational splines, and having an helical thread in which are engaged in a nut-like manner projections from the displacement assembly of the emergency wheels.

16. An emergency wheel assembly for an automotive vehicle, according to claim 1, in which each assembly corresponding to a respective secondary emergency driving wheel has an arm which on the one hand is forked to engage the shaft of the secondary wheel and on the other hand from a casing enclosing a pinion to which the shaft of the same secondary wheel is coupled, said casing also enclosing a transmission and a gear fixed to the tubular shaft having clutch means to the corresponding axle of the main wheel; the shaft of the secondary wheel being so disposed that the tread thereof projects slightly beyond the tread of its respective main wheel.

17. An emergency wheel assembly for an automotive vehicle according to claim 1, in which the internal pressure in said tank is higher than atmospheric, said tank being therefore connected to the output of a compressor having a shaft, a clutch on said shaft connected to a cylinder, said cylinder being in communication with said tank by means of a pipe.

18. An emergency wheel assembly for an automotive vehicle according to claim 1; in which the internal pressure in said tank is lower than atmospheric, said tank being therefore connected to a suction pump including a shaft, a clutch on said shaft connected to a cylinder, said cylinder being connected to said tank by a pipe.

19. An emergency wheel assembly for an automotive vehicle according to claim 1, in which the tank is connected to a compressor, which is coupled to a longitudinally displaceable shaft which has a first clutch member facing a second clutch member mounted on a transmission derived from the engine of the vehicle, said shaft being connected to a spring urged lever coupled to the rod of a piston, said piston being located in a corresponding cylinder the interior of which on one side of said piston is connected to the tank whereas on the other side said piston is subjected to spring pressure.

20. An emergency wheel assembly for an automotive vehicle, according to claim 1, in which the tank is connected to a suction pump which is coupled to a longitudinally displaceable shaft which has a first clutch member facing a second clutch member mounted on a transmission derived from the engine of the vehicle, said shaft being connected to a spring-urged lever coupled to the rod of a piston, said piston being located in a corresponding cylinder the interior of which on one side of the piston is connected to the tank, said piston on the same side being subjected to spring pressure.

21. An emergency wheel assembly for an automotive vehicle according to claim 1, in which the tank is connected to a second tank by means of a conduit, a valve inserted in said conduit and a control arm connected to the rod of a piston in a cylinder and subjected therein to spring pressure, the cylinder being in communication with the interior of the second tank; an alarm device, pipes extending from the second tank to the alarm device and to said change-over device for the secondary wheels accompanying the non-driving wheels of the vehicle; the alarm device including opening valves connected by piping to the first-named tank, from which piping also extends to the change-over device for the emergency wheels following the driving wheels, said piping including in each case respective control and actuating valves.

FEDERICO CARLOS KEMBER.

No references cited.